US 6,701,398 B1

(12) United States Patent
Wyland

(10) Patent No.: US 6,701,398 B1
(45) Date of Patent: Mar. 2, 2004

(54) GLOBAL BUS SYNCHRONOUS TRANSACTION ACKNOWLEDGE WITH NONRESPONSE DETECTION

(75) Inventor: David C. Wyland, Morgan Hill, CA (US)

(73) Assignee: Cradle Technologies, Inc., Mountain View, CA (US)

( * ) Notice: Subject to any disclaimer, the term of this patent is extended or adjusted under 35 U.S.C. 154(b) by 0 days.

(21) Appl. No.: 09/543,806

(22) Filed: Apr. 6, 2000

Related U.S. Application Data

(60) Provisional application No. 60/128,222, filed on Apr. 7, 1999.

(51) Int. Cl.[7] .............................. G06F 13/00; H03K 5/19
(52) U.S. Cl. .......................................... 710/107; 327/18
(58) Field of Search ................................ 710/107, 244, 710/260; 327/18, 20

(56) References Cited

U.S. PATENT DOCUMENTS

| | | | | |
|---|---|---|---|---|
| 3,754,211 A | * | 8/1973 | Rocher et al. ............... | 370/410 |
| 4,346,437 A | | 8/1982 | Blahut et al. ............... | 364/200 |
| 4,459,665 A | | 7/1984 | Miu et al. .................... | 364/200 |
| 4,486,855 A | | 12/1984 | Duke .......................... | 364/900 |
| 4,785,394 A | | 11/1988 | Fischer ....................... | 364/200 |
| 5,287,455 A | | 2/1994 | Rosenthal ................... | 395/200 |
| 5,287,464 A | | 2/1994 | Kumar et al. ............... | 395/325 |
| 5,293,497 A | | 3/1994 | Free ........................... | 395/325 |
| 5,386,585 A | | 1/1995 | Traylor ....................... | 395/800 |
| 5,428,794 A | | 6/1995 | Williams .................... | 395/725 |
| 5,659,707 A | * | 8/1997 | Wang et al. ................ | 710/110 |
| 5,659,718 A | | 8/1997 | Osman et al. ............... | 395/551 |
| 5,666,559 A | | 9/1997 | Wisor et al. ................. | 395/852 |
| 5,687,381 A | | 11/1997 | Swanstrom et al. ........ | 395/742 |
| 5,761,516 A | | 6/1998 | Rostoker et al. ............ | 395/733 |
| 5,822,779 A | | 10/1998 | Intrater et al. .............. | 711/168 |
| 5,867,644 A | | 2/1999 | Ranson et al. ......... | 395/183.15 |
| 5,911,052 A | * | 6/1999 | Singhal et al. .............. | 710/113 |
| 5,948,093 A | | 9/1999 | Swanstrom et al. ........ | 710/267 |
| 5,963,721 A | | 10/1999 | Shiell et al. ................ | 395/309 |
| 5,978,874 A | * | 11/1999 | Singhal et al. .............. | 710/107 |
| 5,986,352 A | * | 11/1999 | Newman et al. ............ | 307/141 |
| 5,991,900 A | | 11/1999 | Garnett ....................... | 714/56 |
| 6,035,364 A | | 3/2000 | Lambrecht et al. ......... | 710/129 |
| 6,256,693 B1 | * | 7/2001 | Platko ........................ | 710/105 |
| 6,374,329 B1 | * | 4/2002 | McKinney et al. ......... | 307/141 |

* cited by examiner

Primary Examiner—Glenn A. Auve
Assistant Examiner—Trisha Vu
(74) Attorney, Agent, or Firm—Thomas Schneck

(57) ABSTRACT

An integrated multi-processor system with clusters of processors on a high speed split transaction bus uses a transaction acknowledge (TACK), by a target device in response to receiving a request from a master device on the bus. The master and target devices connect to the bus via a global bus interface with FIFO registers acting as buffers, and the target interface includes a TACK generator that flips the state of the global bus' TACK line upon determining that a broadcast request is addressed to its target device. A bus idle default device (BIDD) generates a TACK signal when no device is on the bus, and also detects the absence of any TACK response by monitoring the state of the TACK line, thereby indicating that a master device bus attempted to address a nonexistent target a device. The BIDD then generates a dummy response for the requesting master device with data flags set to invalid data.

10 Claims, 7 Drawing Sheets

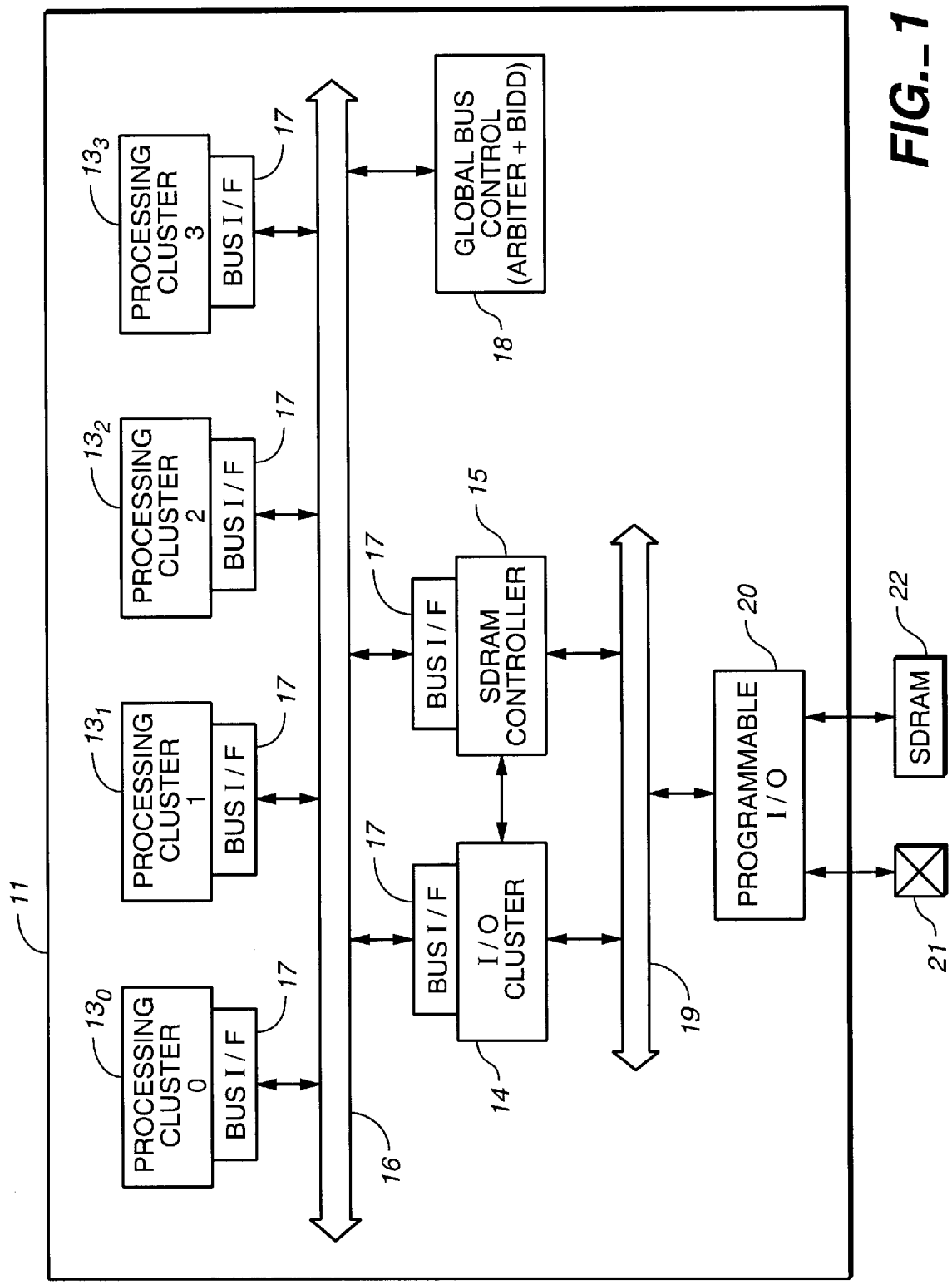
*FIG._1*

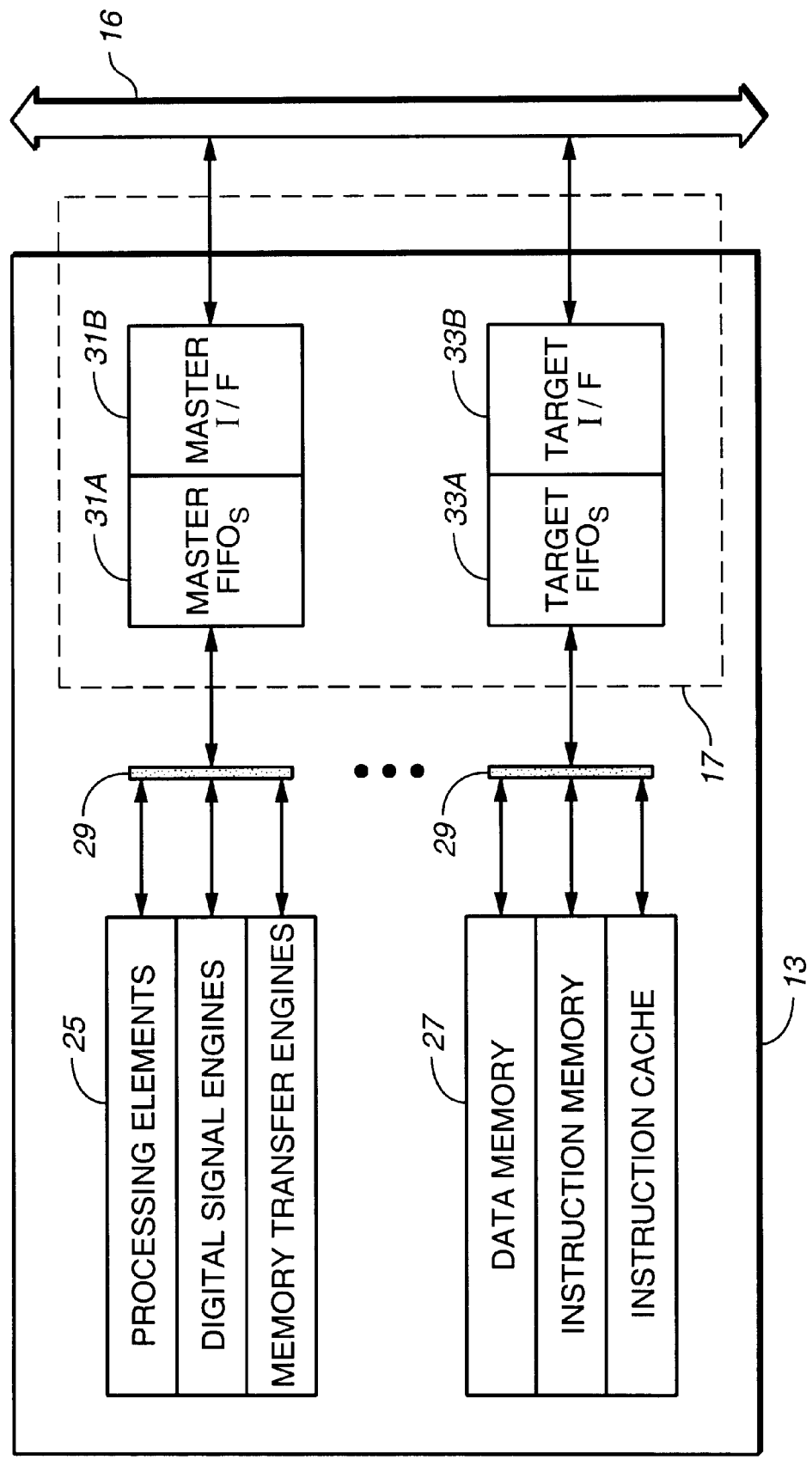
FIG._2

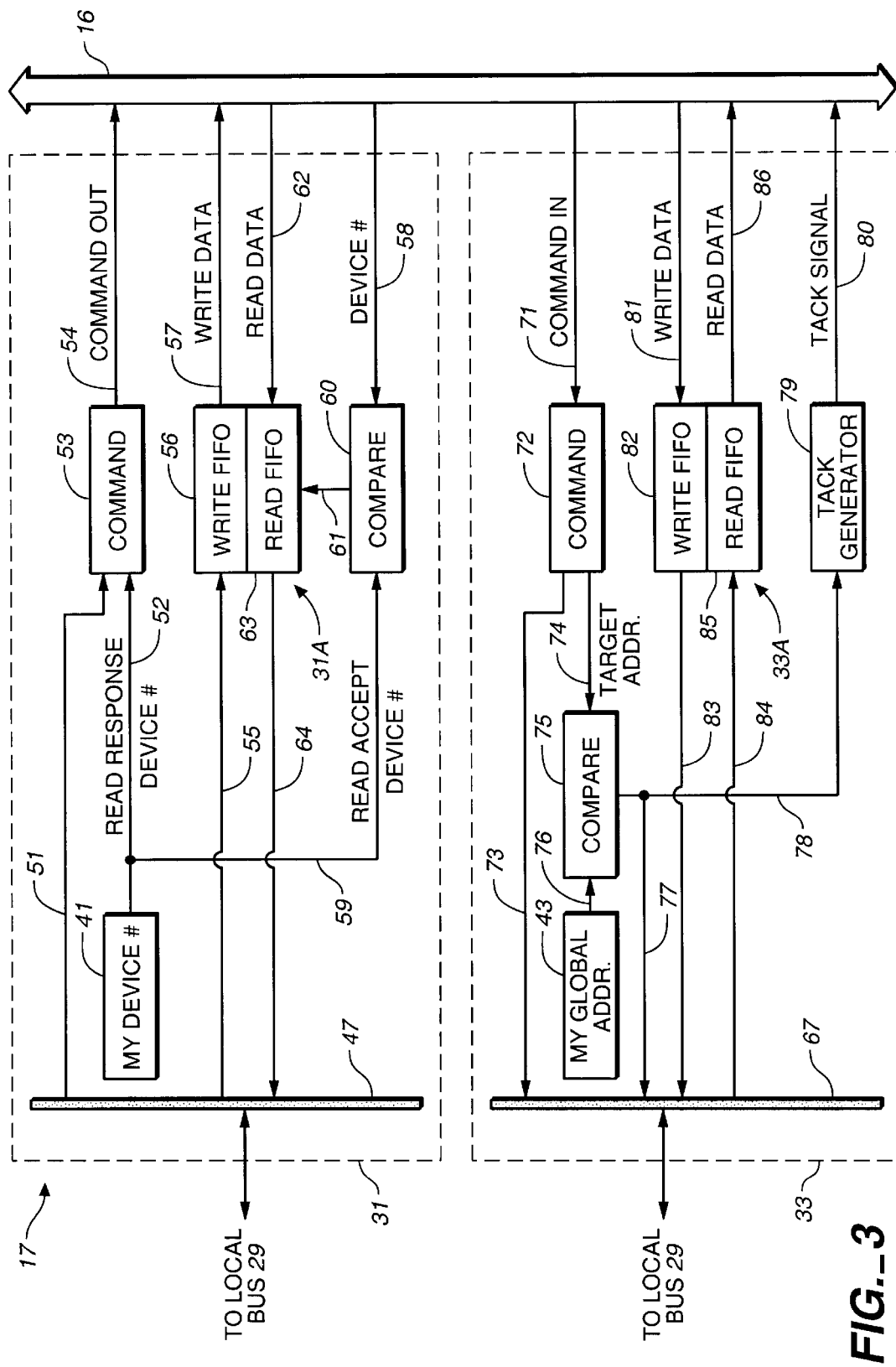
FIG._3

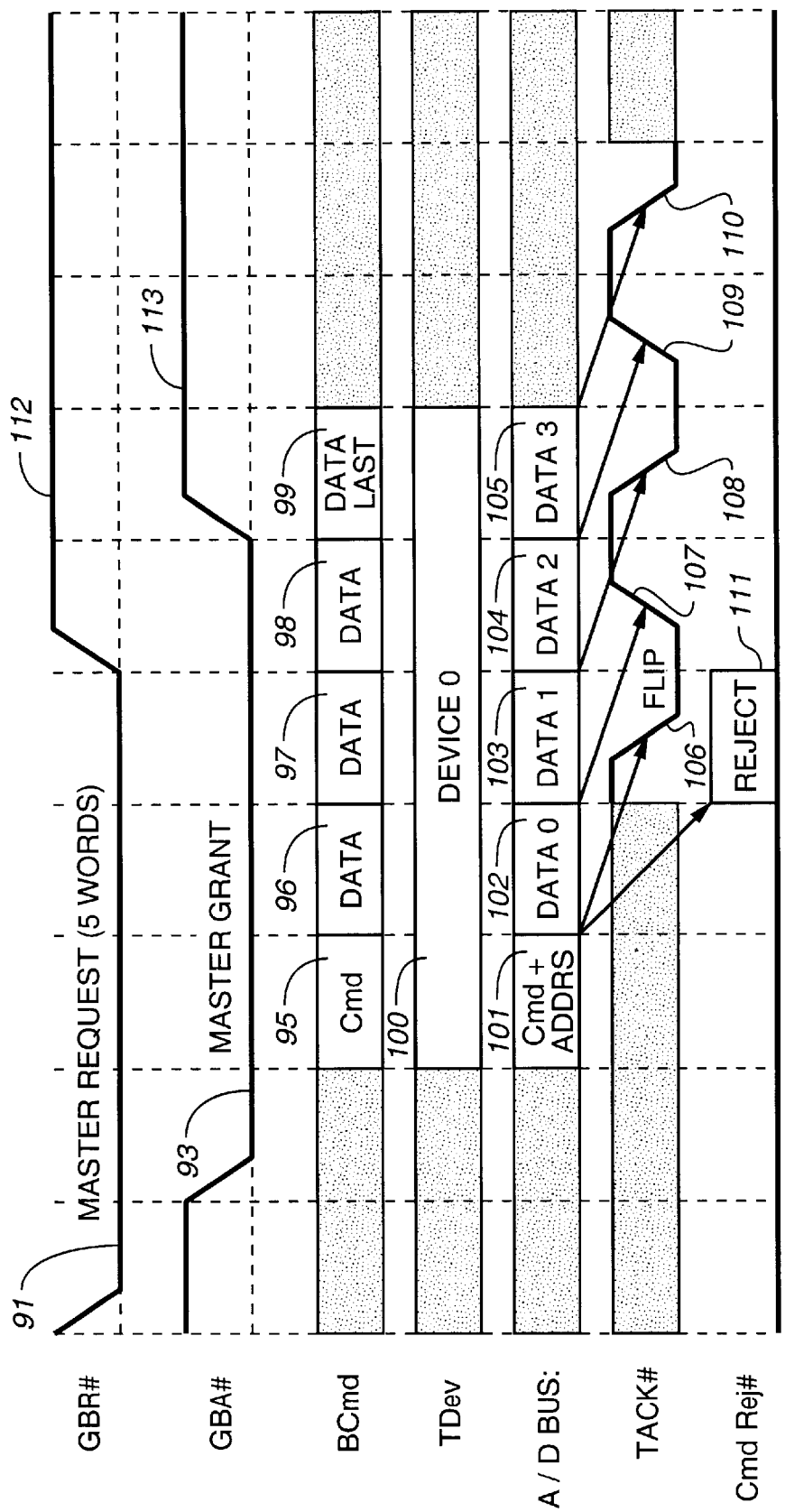
FIG._4

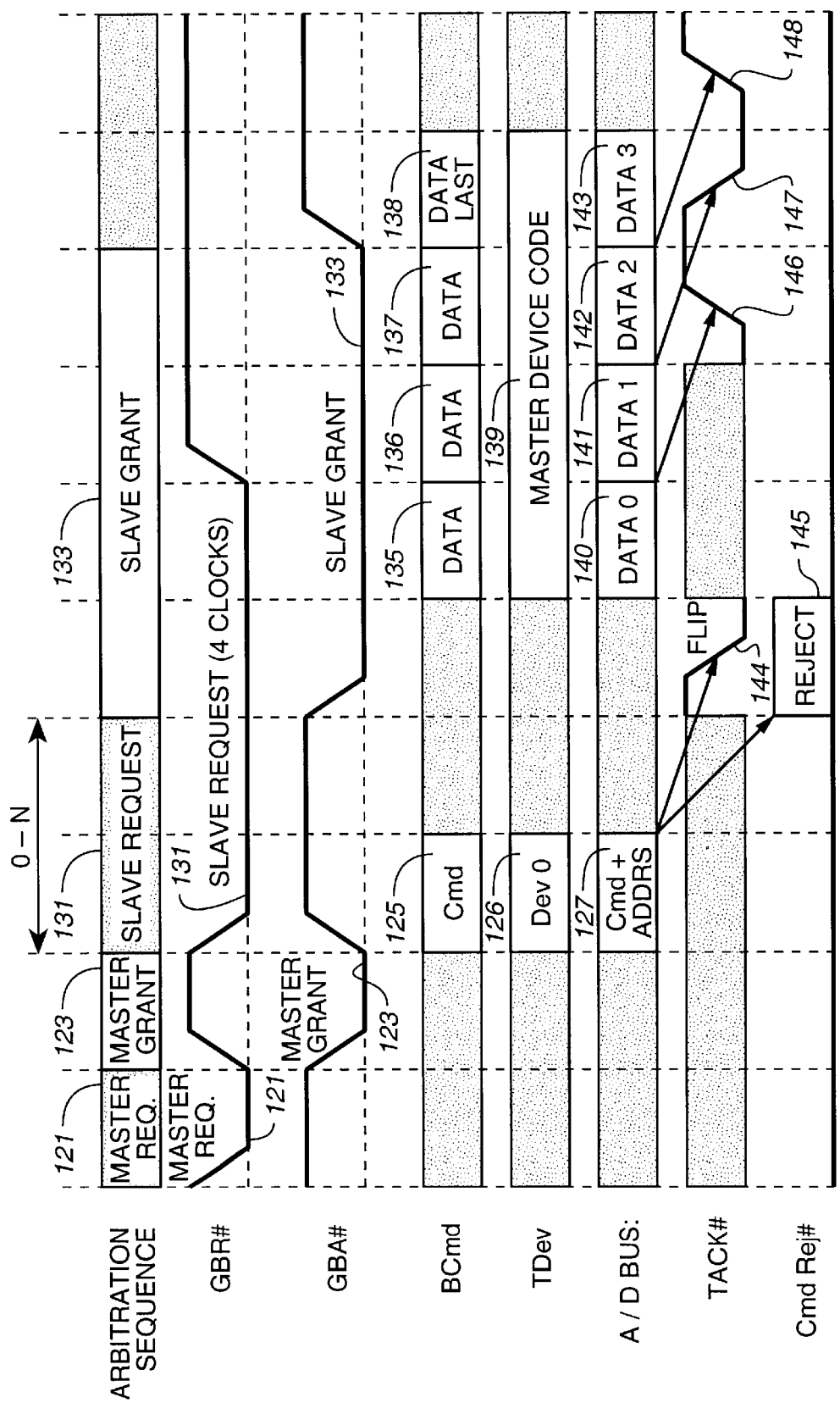
FIG._5

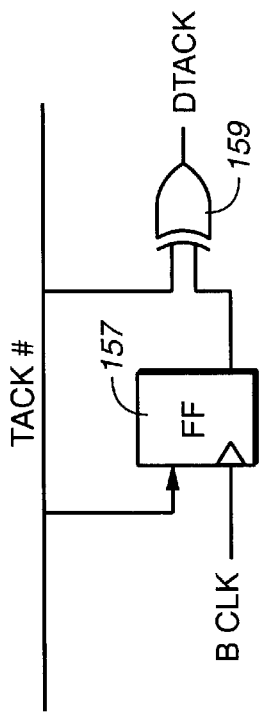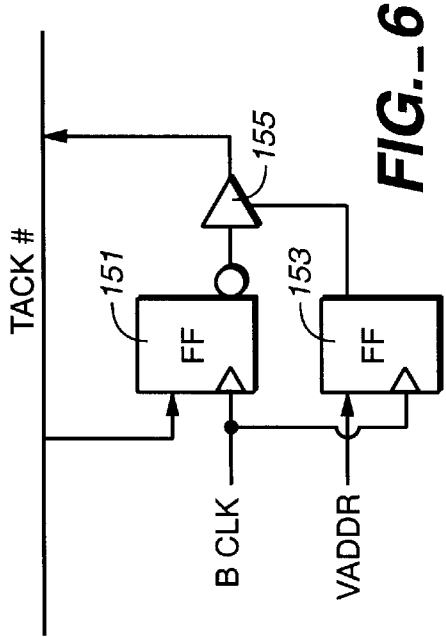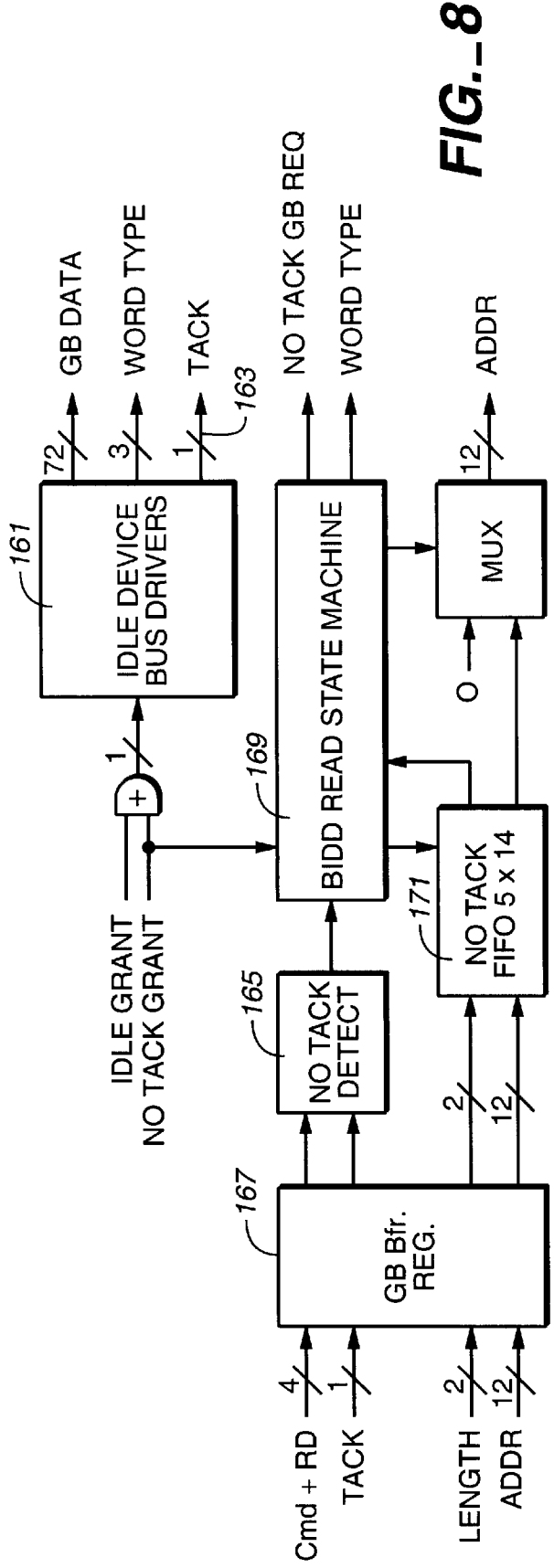

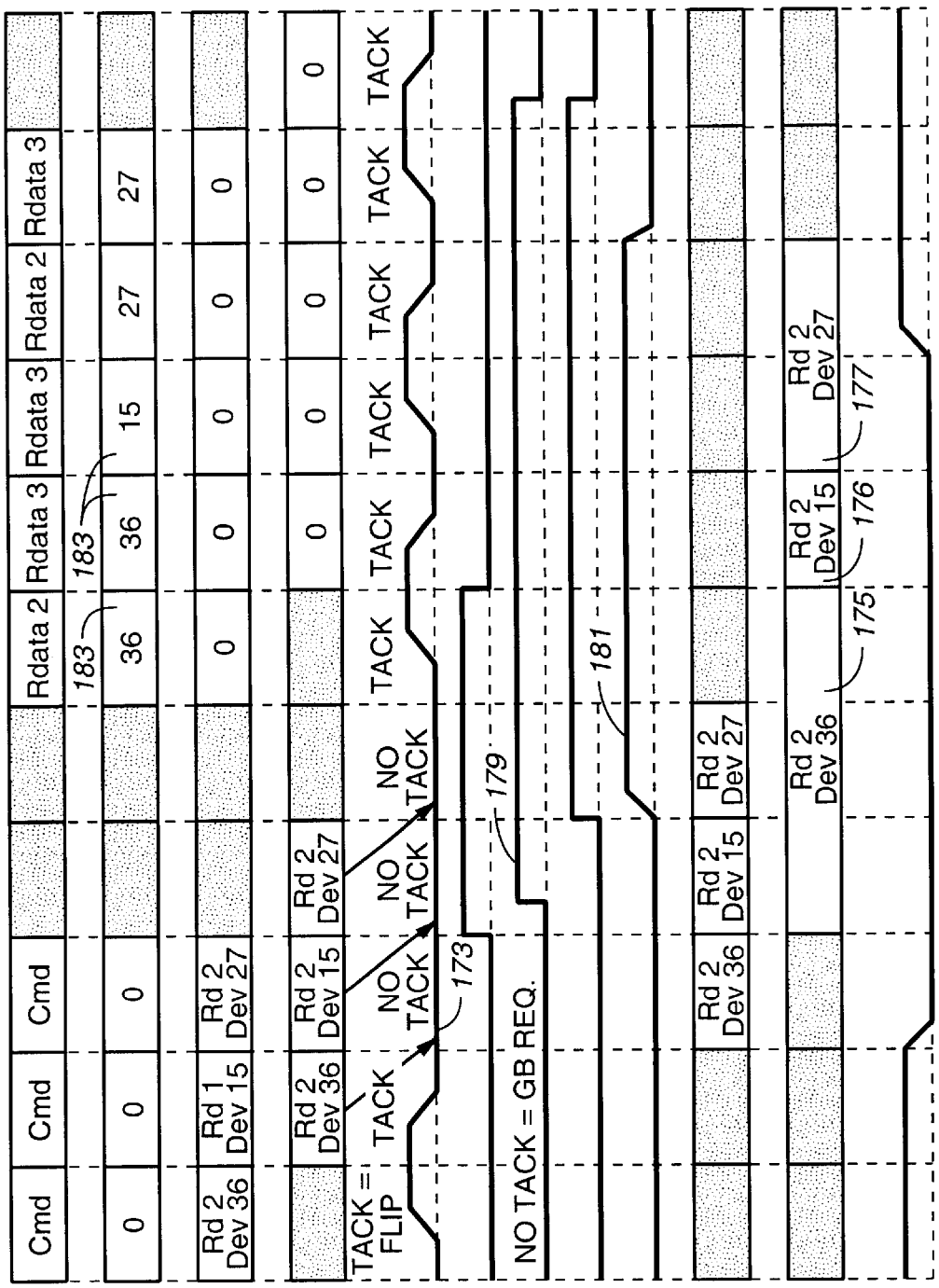
FIG._9

GLOBAL BUS SYNCHRONOUS TRANSACTION ACKNOWLEDGE WITH NONRESPONSE DETECTION

CROSS-REFERENCE TO RELATED APPLICATION

This application claims priority from U.S. provisional application No. 60/128,222, filed Apr. 7, 1999.

TECHNICAL FIELD

The present invention relates to integrated circuit architectures having an on-chip high speed bus with multiple medium speed devices, on or off the chip, attached to the bus, and in particular relates to command or data transfer between devices over the bus and to handshaking methods and circuitry for acknowledging receipt by a target device of a command or data packet placed on the bus.

BACKGROUND ART

In typical bus systems, the bus is at the same speed or slower than the devices attached to it. The system bus is located on a printed wiring board, with processor and memory chip modules being bonded to the board, and the bus is subject to capacitance and inductance delays that slow information transfer over the bus between the various chips. In such systems, it is the bus rather than the devices on the bus which are the primary bottleneck in information transfers, and calculations of latency and bandwidth are concerned with arbitration delays for obtaining access to the bus.

When entire systems, or significant portions thereof, are integrated on a chip, the bus itself may also be integrated onto the chip. Such on-chip buses are very fast, typically about six to ten times faster than those located on printed wiring boards. An on-chip bus operating at a clock rate of 640 to 800 MHz can transfer data at a rate of about 4 to 5 GBytes/sec. At that speed the bus is so fast it is effectively transparent. The bus is significantly faster than even the fastest target device attached to the bus. For example, a DRAM has a peak sustainable volume transfer rate of 0.8 GBytes/sec. Even with two DRAM modules, their total bandwidth is only 1.6 GBytes/sec, still significantly less than the bus bandwidth. This means that the speed of the system is not limited by the speed of the bus, but by the speed of the target devices on the bus.

In order to avoid having one device tie up the bus while it waits to receive data requested from another device on the bus, a split transaction bus may be used. In this way, the bus can have many transactions in progress at the same time. Each data read operation occurs in two steps: read initiation followed by read completion. There is a delay between read initiation and read completion. This delay is the time required for the target to decode the request, get the requested data and send it back to the requesting device (master). During this time, neither the master device nor the target device is on the bus. Rather, after the master device has sent its data read command in a first bus cycle, it then releases the bus. Thus, while the master device is waiting for the completion of its read, the bus can support other transactions. Meanwhile, the target device processes the received request, and only when the read data is ready does it arbitrate for the bus and send the requested data to the master device. The transfer of the data to the requesting device completes the read cycle.

One problem that can occur with split transaction buses is that of a non-existent target device. If there is no device to receive a command, then data does not come back. However, since split transaction buses normally have a delay between a read command and eventual receipt of data, a nonresponse can go unnoticed. The requesting device continues to wait indefinitely. What is needed is a handshaking method that provides a transaction acknowledge by the target device. It is desired that the master device get a indication within two clock cycles of sending a request that the designated target device has received that request. This requirement of essentially immediate feedback is tough to do on a split transaction bus without tying up the bus for the time required to return an acknowledgement, or alternatively requiring the target to arbitrate for the bus for an acknowledgement cycle separate from the data return cycle or cycles.

In U.S. Pat. No. 5,666,559, Wisor et al. describes a system in which peripheral devices receiving data provide an acknowledge signal to the central unit. A time-out counter is provided, and if the time-out period expires prior to return of an acknowledge signal, the control unit asserts an error flag and initiates an interrupt routine.

It is an object of the present invention to provide a synchronous transaction acknowledge circuit with nonresponse detection for a fast split-transaction bus.

SUMMARY OF THE INVENTION

The object is met by providing the bus with a separate transaction acknowledge line, by providing each target device with a driver circuit that flips the current state of the transaction acknowledge line to its opposite state whenever the target device receives a command intended for it, and by providing the bus system with an acknowledge-detection circuit that looks for whether the transaction acknowledge line's state has flipped. This scheme provides immediate feedback to the requesting master device that its command has been received by the designated target device. If the state of the transaction acknowledge line remains unchanged, a nonexistent target device is indicated.

A bus idle default device (BIDD) may be provided to drive the transaction acknowledge line when no other device is driving the bus. In one embodiment, the BIDD may include a circuit that detects a nonresponse from a nonexistent target device and which then generates a dummy response for the requesting master device. The dummy data is flagged to indicate that it is not the requested data. Alternatively, detection of the absence of a transaction acknowledge may be carried out by a detector in the bus interfaces of every master device.

BRIEF DESCRIPTION OF THE DRAWINGS

FIG. 1 is a schematic block diagram of an integrated multi-processor system with a high speed split-transaction bus, in which the synchronous transaction acknowledge with nonresponse detection of the present invention may be located.

FIG. 2 is a schematic block diagram of a processing cluster in the system of FIG. 1, with a global bus interface containing the transaction acknowledge of the present invention.

FIG. 3 is a detailed block diagram of the global bus interface 17 of FIG. 2, showing the transaction acknowledge generator 79 in the target interface.

FIG. 4 and 5 are timing diagrams of write and read transfers, respectively, on the global bus 16 in FIGS. 1–3, with the transaction acknowledge (signal TACK#) indicated as a flip in the signal state.

FIG. 6 and 7 are block circuit diagrams of transaction acknowledge (TACK) generating and detecting logic, respectively.

FIG. 8 is a detailed block diagram of a bus idle default device (BIDD), part of the global bus control unit 18 of FIG. 1, containing the no TACK detector of FIG. 8.

FIG. 9 is a timing diagram illustrating the response of the BIDD of FIG. 8 to a no TACK detection.

BEST MODE OF CARRYING OUT THE INVENTION

With reference to FIG. 1, an integrated circuit 11 forming a multi-processor system has a plurality of processing clusters $13_0$–$13_3$ (here, four in number), as input/output (I/O) cluster 14, and an SDRAM memory controller 15, all attached to an on-chip high speed global bus 16 by means of bus interface units 17. A typical system may have the global bus 16 operate at a 640 MHz clock rate, while the clusters 13–15 operate at a clock rate which is half that, i.e. 320 MHz. A global bus control unit 18 includes a bus arbiter regulating access to the bus 16 by the various clusters 13–15, and also includes a bus idle default device (BIDD) for use when no cluster element is driving the bus. The I/O cluster 14 and SDRAM controller 15 communicate with off-chip devices through an I/O bus 19 and programmable I/O subsystem 20 connecting to I/O pads 21 of the chip and to one or more SDRAM memory chips 22. The present invention focuses principally on the global bus 16, the bus interface units 17, and the BIDD device in the global bus control unit 18.

Referring to FIG. 2, the integrated circuit's bus structure consists of a single global bus 16 and a local bus 29 for each of the plurality of clusters 13–15 attached to the global bus 16 as in FIG. 1. Each processing cluster 13 includes a plurality of processing functions, such as processing elements, digital signal engines, memory transfer control engines and associated cluster data and instruction memories, caches and registers, all attached to the local bus 29 of the cluster 13. I/O clusters (14 in FIG. 1) are similar, except that I/O transfer engines replace the digital signal engines and memory transfer control engines, and an I/O bus (19 in FIG. 1) also interfaces with the local bus 29. The buses 16 and 29 allow the various elements on the bus to transfer information (data, instructions, etc.). Bus elements consist of two types: masters 25 and targets 27. Processing elements, digital signal engines, memory transfer control engines and I/O transfer engines are examples of bus master devices 25. Memories and registers, including cluster data and instruction memories and caches, cluster hardware registers for the processing elements digital signal engines and memory transfer control engines, as well as DRAM memories and system registers, are examples of bus target devices 27. All information transfer is between masters and targets, with the masters initiating transfers to and from targets. All transfers within a cluster 13 are carried out over the local bus 29, while information transfers between clusters, including with the I/O cluster (14 in FIG. 1) and SDRAM controller (15 in FIG. 1) are carried out over the global bus 16 via global bus interfaces 17. The global bus interface 17 includes master interfaces 31B with associated FIFO register banks 31A and target interfaces 33B also with associated FIFO register banks 33B. All write operations are direct transactions from master to target. All read operations are split transactions with a command write from master to target to initiate the transaction, subsequently followed by a separate response write from the target back to the originating master to complete the transaction. The global bus control (18 in FIG. 1) arbitrates among the master and target interfaces 31B and 33B for access to the global bus 16 and provides clocking for data transfer between the master and target FIFOs 31A and 33A.

With reference to FIG. 3, the global bus interface 17 includes a master interface 31 and a target interface 33. The master interface 31 initiates transfers and the target interface 33 responds to transfer requests received from a master interface 31. Most global bus interfaces 17 have both master and target interfaces 31 and 33, although some devices on the global bus 16, such as a register bank or a memory could have only a target interface 33. The bus system uses uniform addressing with a single 32-bit address for all bus elements. Any bus master element can address any other bus target element using the target element's bus address. Accordingly, each global bus master interface 31 has a unique hardware-assigned device number, called "My Device Number", stored in a register 41. This number indicates the unique interface 31 that is to receive data in a global bus transfer. It is a hardware port number and will never be generated by nor visible to the programmer. Each target interface 33 also has a range of global bus addresses, called "My Global Address Range", that identifies the addresses to which the target will respond. This address range is likewise stored in a register 43 in the target interface 33.

The global bus 16 is a single transaction write, split transaction read bus. it is a 64-bit bus, with 32-bit addresses and 64-bit data transfers. Each bus cycle specifies the transaction type (idle, command, data, last data), a bus device to receive the information and 64-bits of command or data. Command octets contain the command information (read/write, etc.) and a 32-bit transfer address. The destination to receive the data (either a target device receiving a read command or a write command plus write data, or a master device receiving data returned by the target device) can either be a specific device or a broadcast to all devices (designated as "device 0"). The recommended global bus transfer atom is eight words of four bytes each, which results in for bus octets of eight bytes (64 bits) each, with one, two and four octet transfers as special cases. A four octet data transfer has a bus efficiency of 80% (one command octet per four data octets). All transfers are writes to a FIFO (56, 63, 82, 85 in FIG. 3) in the global bus interface 17 on the bus 16. Addresses and data are pipelined. All data transfers on the bus are 64-bit bus octet transfers with naturally aligned addresses. Transfers can start at any address. Data is transferred synchronous to a bus clock, with the FIFO registers in each bus interface device 17 functioning to buffer the address and data information to and from the global bus 16, mainly to compensate for clock speed differences and skew between the data source and destination. The FIFO registers can add pipeline delay of up to 4 clock cycles between the source and destination (2 clock cycles at each end).

The global bus 16 has four information transfer types: data write, data read, control write and control read. A data write operation by a bus master sends a transfer command in a first bus cycle, followed by one, two or four data octets in the following cycles. The transfer of the last data octet completes the write cycle. A data read operation by a bus master sends the transfer command in the first cycle, then releases the bus. The targeted device receives the command. When the read data is ready, the target arbitrates for the bus and sends the read data to the bus master indicated in the command octet. The transfer of the last data octet to the requesting master device completes the read cycle. A control write is an address variant of a data write operation with a single data octet: It writes data to a separate 32-bit control address space. The data/control bit in the command octet indicates the write to the control address space. All targets receive the command and data octet, completing the cycle. Control writes go to a separate data register in the interfaces that receive them. This is to prevent command reject by interfaces busy with data operations. Control writes are used to send base addresses to each cluster, and to send base addresses and configuration data to all other global bus devices such as the global registers. Control write is also used to send global timing signals and global wake-up interrupts to all clusters. Each cluster receives a global bus control write of its cluster base address. Upon receiving the cluster base address, each cluster sends its base address to all it processing elements and digital signal engines, which store this address so that they can respond to transfer requests to their internal registers when the appropriate global address is present on the cluster data bus. Control read is a counterpart to control write. Control read allows the host or configuring device to read base address and configuration registers in the global bus control address space as well as write them. This is required for PCI configuration registers (such as those visible through a PCI interface to external PCI devices).

Each global bus master has only one transaction in process at any one time. It cannot initiate another transaction until its current transaction is complete. Even though each master can support only one transaction at a time, the bus can have many transactions in progress at a time. Each read operation occurs in two steps: read initiation followed by read complete. There is a delay between read initiation and read completion. This delay is the time required for the target to decode the command, get the read data and sent it back to the master. During this time, neither the master nor the target is on the bus. While a master is waiting for completion of its read, the bus can support other transactions. For example, other masters can perform write transfers and initiate other read transfers.

Each global bus transaction begins with a command octet written to a target device. A command octet may include the following fields: a read/write transfer bit, a data/control type bit, a two-bit transfer length field for indicating to DRAM memories the expected transfer length in octets (one, two, four, or greater than four), a two-bit priority field, two multibit fields (e.g., six bits each) designating, respectively, the device number of the originating master interface device for use by the target device as a destination in responding to read commands and the sub-device number designating the specific device within a cluster, and a 32-bit address field designating the target device address and address of the data within the target. Other fields may be defined or field sizes extended, if desired, providing the total size of the command does not exceed the one octet size established by the global bus.

Referring again to the interface structure of FIG. 3 along Edith the timing diagram of FIG. 4, a data write operation in which a master device writes 1 to 4 data octets to a designated target device begins with transfer of a command from a master device to the master interface 31 via the local bus 29 to the master interface bus 47, and then via lines 51 to the command buffer 53. The master interface's device number, received by the command buffer 53 via lines 52 from the "My Device Number" storage register 41, is appended to the command in the appropriate field. Next, the master interface 31 requests access to the global bus, as seen by the global bus' request line (GBR#) going low at reference numeral 91 in FIG. 4. The request is made for the command octet and also for each of the data octets to be written. In the example of FIG. 4, the master's request signal stays low for 5 clock cycles for a 5 octet transfer. The global bus control's arbiter (18 in FIG. 1) grants access to the master interface for the requested number of cycles, as seen by the global bus' request acknowledge or grant line (GBA#) going low at reference numeral 93 for five clock cycles. The master interface 31 then sends the write command octet and the data octets to the global bus via the command-out lines 54 in FIG. 3, and via the write data lines 57 from a write FIFO register bank 56 communicating with the local bus 29 via interface bus 47 and write data lines 55. This issue of the write command followed by the required number of data octets is indicated by octets 95–99 in FIG. 4.

The write command octet is broadcast to all global bus target interfaces (including its own), as indicated at 100 in FIG. 4 by target device code (TDev)=0. It is a broadcast because the master does not know which global bus device will respond to the address contained in the command octet. The command octet contains the 32-bit global address 101 for the transfer as well as the transfer type (write) and transfer length (1–4 octets). It also contains the master's device number, My Device Number, but it is not used in write operations. Each target device 33 receives the write command and write data in the target interface's command buffer 72 via command in lines 71 and in the target interface's write FIFO register 82 via write data lines 81, respectively. It compares the 32-bit address in the write command, received by the compare circuit 95 via the target address lines 74, against its own global address, My Global Address, received by the compare circuit 75 via lines 76 from the storage register 43. If there is a match, it accepts the write data 102–105 and clocks it out of its write FIFO 82 over lines 83. This terminates the write operation. If there is a match but the device is busy with a previous command, it sends a command reject to the bus. If there is no match, the target ignores the command and flushes the write FIFO 82 in preparation for the next write command. Note that all writes are broadcast. Normally only the intended target will accept the broadcast write data; the other devices will discard it. However, it is possible to broadcast write data to more than one target if the targets are designed to decode a range of broadcast addresses.

We now consider a master data read from a target with reference to FIGS. 3 and 5. The master interface 31 initiates the transfer by sending a read command octet to the global bus after requesting and receiving access to the bus, as indicated in FIG. 5 at 121, 123 and 125. The read command octet is broadcast (as indicated by device 0 at 126 in FIG. 5) to all global bus target interfaces (including its own). It is broadcast because the master does not know which global bus device will respond to the address (at 127 in FIG. 5) contained in the command octet. The command octet contains the 32-bit global address for transfer as well as the transfer type (write) and transfer length (1–4 octets). It also contains the master's device number, My Device Number, which the target device will use for its response. When the master has sent the read command octet, it arms its read FIFO 63 to receive the read data over read lines 62 at a later time. The master at this point normally stalls and waits for the target to send the read data, completing the read command. Each target interface 33 receives the read command octet over command-in lines 71 into buffer 72. Using the compare circuit 75, it compares the 32-bit address in the read command against its own global address, My Global Address, stored in register 43. If there is a match, the command is transferred over lines 73 and 77 to the interface bus 67 and thence to the local bus 29, it gets the data requested via the local bus 29, interface bus 67, read lines 84 and 86 and read FIFO register bank 85 and sends it to the global bus 16. After requesting and obtaining access to the global bus 16, as indicated at 131 and 133 in FIG. 5, it sends the data 135–138 to the master that requested the read data by using the master's device number contained in the command octet as the response address, as indicated by use of the master device code 139 in FIG. 5. This terminates the read operation. If there is a match but the device is busy with a previous command, it sends a command reject 145 to the bus 16. If there is no match, the target ignores the command. Note that the only valid way that data 140–143 can be sent to a waiting read FIFO 63 in a master is in response to a previously sent, read command. only command octets contain the device number of the master that sent the command, and this device number is hard wired (41) into the master device sending the command. The device number is read on lines 58 by compare circuit 60 and checked against the stored device number (41) received by the compare circuit 60 over lines 59. A match enables the FIFO 63 via control line 61. There is no valid way that some other device could send data to an open master read FIFO, causing improper completion of an open read command.

Target devices receive broadcast writes and respond to reads. Alternatively, a master device could send its write command and data to a specific target device instead of broadcasting it, if the master knew which device was to receive the command. You would do this to save power, so no other device would receive the command and dissipate power as a result.

In summary, the basic write transfer sequence is as follows, using a four-octet data transfer as an example:
1. The master device requests a 5 octet transfer on the bus.
2. The master issues the target bus Device number and the write command. The target Device number may be zero (broadcast) if the target bus Device number for the write is unknown. The write command contains the write address, write command, command priority, chain bits and master device code.
3. Issue data octet 0–2 (Transfer may be 1–4 octets depending on transfer length code.)
4. Issue data octet 3 and the Last transfer type, and release the bus. Bus arbitration starts again in this cycle.

The basic read transfer sequence, using a four-octet data transfer as an example, is as follows:
1. The master device requests a 1 octet transfer for the read command.
2. The master issues the target bus Device number and read command. The target Device number may be zero (broadcast) if the target bus Device number for the read is unknown. The read command contains the read address, read command, command priority, chain bits and master device code. The master device code will the DRAM response address.
3. Release the bus.
4. The target device requests a 4 octet transfer for the read data response.
5. The target issues the target device address and the first octet of read data. The master device code is the target for the read data. Transfer may be 1–4 octets depending on transfer length code.
6. Issue data octet 1–2.
7. Issue data octet 3, the Last transfer type, and release the bus. Bus arbitration starts again in this cycle.

In the context of a system like that just described, using a split transaction bus, the present invention provides a transaction acknowledge (TACK) signal to the bus system to indicate receipt of a command or data by at least one target device. In particular, the target device receiving each octet transferred on the global bus 16 acknowledges the octet by activating a Transfer Acknowledge (TACK) line of the global bus 16. This is true for each octet transferred, command or data. TACK indicates that the target has received a command octet or data octet intended for it. As seen in FIG. 3, when a target device 33 receives a control read or write octet, it decodes it to see if it is the intended target using compare circuit 75. If it is, it activates TACK (by means of a TACK generator circuit 79 providing a TACK signal on lines 80) two clocks after the octet was transferred as indicated in FIGS. 4 and 5 at 106 and 144 for the TACK signal. The target activates TACK even if it rejects the command (as at 111 and 145 in FIGS. 4 and 5). If the command was a write, each of the write data octets is also acknowledged by the target (at 107–110 in FIG. 4). Likewise, a master receiving read data activates TACK for each octet read (at 146–148 in FIG. 5). TACK allows you to detect when no device has responded to a command, which is a bus error. TACK detects this immediately, without having to wait for a bus time out. TACK is valuable for debug; it lets you know if any device responded. More than one device can respond with a TACK signal without interference.

TACK has unique coding. To activate TACK, you change its state from the previous clock. For continuous TACK signals, the TACK line will flip on each clock. Each target device activates TACK for each bus clock. Note that more than one device can respond with a TACK signal: All responding devices will drive TACK in the same direction. FIGS. 6 and 7 block diagrams of logic to generate the TACK signal and to detect the TACK signal. In the generator logic of FIG. 6, the Last TACK flip flop 151 records the TACK signal value for the prior cycle. The Decode flip flop 153 records a valid address decode in the previous cycle. If the target address was valid in the previous cycle, this logic responds with a TACK signal by enabling the TACK driver 155. The TACK driver 155 uses the inverted output of the flip flop 151 to generate the current TACK value, which is the complement of the previous TACK value. This TACK generator circuitry is part of the target bus interface 33 of each target device or cluster containing target devices on the global bus.

In the Detector logic of FIG. 7, the Last TACK flip flop 157 records the TACK signal value for the prior cycle. If the current TACK signal value is the complement of the TACK signal value in the prior cycle, the current TACK signal is valid, and the XOR gate 159 outputs a "true" TACK detected signal value. The TACK detector circuitry may be part of the master bus interface of each master device or cluster of master device on the global bus. Alternatively, a single TACK detector can form part of the bus idle default device (BIDD) of the global bus control (18 in FIG. 1). In either case, if the bus is idle, the BIDD will activate TACK and drive the bus to default levels. If a command is issued and no device responds, the TACK line will not change. This is how you detect that you have addressed a non-existent device. If no device drives TACK, stray capacitance and bus hold logic will keep the TACK line at its previous level.

Each master device on the GB can have only one outstanding GB transfer in progress at any one time. For read transfers, the GB master waits for read data to be returned. For write transfers, the master waits for a bus grant for the command and the absence of a command reject from the bus indicating that the write command and data have been accepted. This provides automatic control of the transfer bandwidth between the master(s) and a target. This is called self throttling. Each master waits for the target to respond. The target may have received many GB transfer commands and be in the process of servicing them. These commands are typically buffered in a command FIFO. A target may have N commands in its FIFO, from N masters. Once the commands are in the FIFO, all N devices will wait until each of them has had its command acknowledged. Because each master will wait—however long—for transfer complete, no target can be overrun.

With reference to FIGS. 8 and 9, when the global bus is idle, no active device is selected to drive the bus. If no active device is selected, the arbiter selects a default device, the Bus Idle Default Device (BIDD), to drive the bus. Otherwise, the device lines would float, potentially causing noise and errors. The BIDD drives the bus lines to valid levels by means of idle bus logic and bus drivers 161 responsive to an idle grant signal from the arbiter. It sends zeros for the data word, byte enables and device address, and zero for the Word Type: the idle command. Alternatively, the address/data lines are held at their previous values (for low power); the byte enables to inactive; and the target device number to all ones. It also activates the TACK signal at output 163 because it is a valid device, the BIDD, and is validly driving the bus. The only time the TACK signal is not driven is when a command or data word is sent on the bus and no device responds to it.

The BIDD also responds to read commands with no TACK, through the TACK detector logic 105 (which is that shown in FIG. 7), indicating that no device will respond to the read. Global bus master devices can issue read and write commands to non-existent target addresses (devices 36, 15 and 27 in the example of FIG. 9). In this case, no device will decode the address, respond to the command and issue the TACK signal (as indicated by the no TACK responses at 173 in FIG. 9). The GB master that issued the command will be stalled waiting for the read data unless it notices the lack of TACK and aborts the command. The next question is how to abort the command. The simplest method is to provide substitute data (175–177 in FIG. 9) and let the command to run to normal completion with a flag that notes that the data is not valid. This means no special modification to the receiving state machines (and other state machines that depend on them), but requires inserting dummy data. In order for global bus master to do this, it would have to request the bus (request at 179 and grant at 181 in FIG. 9) and either put the dummy data on the bus to be received by itself or send 1–4 bus idle cycles. It has to do this to hold off the global bus while inserting the dummy data. Otherwise, the global bus could be trying to put data in the FIFO while the global bus master logic was inserting dummy data.

FIG. 8 shows the micro architecture for the BIDD with no TACK response logic. The BIDD monitors the device zero broadcast commands through a buffer register 167 and checks for a read command with no TACK response. In the case of a no TACK response (at 183 in FIG. 9), a state machine 169 requests the global bus and issues a read response of 1, 2, or 4 octets of zero data, as determined by the 2 length bits in the command. It returns a zero data value and zero byte enables, with the appropriate word type codes for read response. The zero byte enables indicate that the data is invalid. (Read data normally returns data with all byte enables set to ones.) The BIDD also responds with the device address from the read command (at 183 in FIG. 9) so the dummy data goes to the original requesting device. The BIDD uses a FIFO 171 to hold up to five read requests from the GB before the BIDD is granted control of the bus for the No TACK read response.

FIG. 9 shows a timing diagram for the no TACK response. The BIDD has the highest priority when requesting the GB to minimize command buffering for read commands with no TACK. Command buffering is required because it is possible to have several read commands with no TACK occur in succession. With the highest priority, only 3 commands need to buffered, corresponding to the number of clocks between detection of the condition and putting the dummy read data on the GB; one to detect the condition, one to issue the GB request and one to receive the GB grant. This timing diagram in FIG. 9 assumes that the BIDD has the highest priority for the GB arbiter and also assumes that the BIDD can submit a DC request (179) as opposed to a pulsed request. The BIDD can hold the GB request for a longer period than needed because No tack responses are infrequent. Once the BIDD read responses have been issued, the BIDD can fill in with idle cycles if the grant time is longer than needed. Several read commands to non-existent addresses could occur in succession, meaning that the BIDD has to buffer these read commands. It has to buffer commands until it can gain access to the GB. By putting the TACK non-response logic as the highest priority GB device, this will minimize the buffering to the number of clocks between the time the TACK was detected and the time the GB grant is received. This should be 3 commands: one to detect it, one to issue the request and one to receive the grant. Note that only 14 bits need be saved from the command word: the 2 bits of the length code and 12 bits of the device and sub device address for the read response.

What is claimed is:

1. In an integrated circuit having multiple circuit devices attached to an on-chip bus, transaction acknowledge circuitry with nonresponse detection for indicating that a command placed on said bus has not been received by a designated target circuit device, the circuitry comprising:
   a separate transaction acknowledge line provided with said bus;
   a drive circuit means associated with each target circuit device for flipping a current state of said transaction acknowledge line to an opposite state whenever a command designated for a particular target circuit device is received by that device, nonreceipt of a command by a designated target circuit device being indicated by the state of said transaction acknowledge line remaining unchanged; and
   a bus idle default device attached to said bus and connected to drive said transaction acknowledge line to its opposite state whenever said bus is idle.

2. The transaction acknowledge circuitry of claim 1 wherein said bus idle default device includes means for monitoring said transaction acknowledge line and generating a dummy response whenever nonreceipt of a command is indicated.

3. In an integrated circuit architecture having an on-chip bus with multiple circuit devices attached to the bus, whereby commands and data are transferred between said circuit devices over the bus, the bus being a split transaction bus for data read operations, a synchronous transaction acknowledge (TACK) system with nonresponse detection circuitry for determining receipt by a designated device of a command or data placed on said bus, the TACK system comprising:
   a TACK line associated with said on-chip bus, the TACK line having two opposite states;
   bus interface means associated with each circuit device for flipping the current state of the TACK line to its opposite state whenever a circuit device receives a command or data intended for that circuit device;

a bus idle default device (BIDD) attached to said bus for flipping the current state of the TACK line to its opposite state whenever said bus is idle; and nonresponse detection means for monitoring the state of said TACK line, nonreceipt of a command or data by a designated circuit device being indicated whenever the state of said TACK line remains unchanged.

4. The TACK system of claim 3 wherein said nonresponse detection means includes means for generating dummy data in response to nonreceipt of a command and sending said dummy data to said circuit device that originated said command, said dummy data indicating said nonreceipt of said command.

5. The TACK system of claim 3 wherein said nonresponse detection means is a part of said BIDD.

6. The TACK system of claim 3 wherein said nonresponse detection means comprised detection circuits associated with each of said circuit devices attached to said bus.

7. The TACK system of claim 3 wherein said bus interface means associated with each circuit device has means for comparing an address field of any command placed on said bus against an address range to which that circuit device will respond, and whenever there is a match transferring said command to the circuit device and flipping the state of the said TACK line.

8. The TACK system of claims 7 wherein said means for flipping the state of said TACK line comprises:

a first flip-flop having an input connected to said TACK line and a inverted output, a second flip-flop having an input connected to said address compared means and an output, both flip-flops being clocked by a clock for said bus, and a tri-state driver having an input connected to said inverted output of said first flip-flop, an enable connected to said output of said second flip-flop, and an output connected to said TACK line.

9. The TACK system of claim 3 wherein said nonresponse detection means comprises:

a flip-flop clocked by a clock for said bus and having a input connected to said TACK line, and an output, an exclusive OR gate with a first input connected to said TACK line, a second input connected to the output of said flip-flop, and an output providing said indicative of nonreceipt of a command or data on said bus.

10. The TACK system of claim 3 wherein the integrated circuit architecture forms a multi-processor system with some of the circuit devices attached to said on-chip bus being processing clusters, the bus operating at a higher clock rate than the clusters.

* * * * *

UNITED STATES PATENT AND TRADEMARK OFFICE
CERTIFICATE OF CORRECTION

PATENT NO. : 6,701,398 B1
APPLICATION NO. : 09/543806
DATED : March 2, 2004
INVENTOR(S) : David C. Wyland It is certified that error appears in the above-identified patent and that said Letters Patent is hereby corrected as shown below:

On the Title Page Item (73) Assignee reads "Cradle Technologies, Inc.", should read:
-- Cradle Technologies --.

Signed and Sealed this

Nineteenth Day of May, 2009

JOHN DOLL
*Acting Director of the United States Patent and Trademark Office*